United States Patent
Katsura et al.

(10) Patent No.: US 10,649,084 B2
(45) Date of Patent: May 12, 2020

(54) OBJECT DETECTION APPARATUS AND OBJECT DETECTION PROGRAM

(71) Applicant: DENSO WAVE INCORPORATED, Chita-gun, Aichi-pref. (JP)

(72) Inventors: Shoji Katsura, Chita-gun (JP); Gaku Takano, Tokyo (JP); Wataru Kobori, Tokyo (JP); Tetsuya Iwasaki, Kariya (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 445 days.

(21) Appl. No.: 15/481,795

(22) Filed: Apr. 7, 2017

(65) Prior Publication Data
US 2017/0293030 A1    Oct. 12, 2017

(30) Foreign Application Priority Data

Apr. 11, 2016  (JP) .................................. 2016-079114

(51) Int. Cl.
*G01S 17/04* (2020.01)
*G01S 17/08* (2006.01)
(Continued)

(52) U.S. Cl.
CPC .............. *G01S 17/04* (2020.01); *G01S 7/415* (2013.01); *G01S 13/56* (2013.01); *G01S 17/08* (2013.01);
(Continued)

(58) Field of Classification Search
CPC ........ G01S 17/00; G01S 17/02; G01S 17/026; G01S 17/08; G01S 17/06; G01S 17/42;
(Continued)

(56) References Cited

U.S. PATENT DOCUMENTS

2003/0011509 A1 *  1/2003  Honda .................... G01S 7/412
                                                          342/70
2014/0118182 A1 *  5/2014  Oh ........................ G01S 13/867
                                                          342/52
(Continued)

FOREIGN PATENT DOCUMENTS

JP          2007-108129 A      4/2007

*Primary Examiner* — Olumide Ajibade Akonai
(74) *Attorney, Agent, or Firm* — Oliff PLC

(57) ABSTRACT

An object detection apparatus measures a distance to a detected object at each irradiation angle, based on reflected waves of electromagnetic waves irradiated from a laser light irradiating unit at each irradiation angle. The apparatus determines whether the measured distance remains unchanged for prescribed period of time, for each irradiation angle, and stores the determined distance in a storage unit as a stationary object distance in association with the irradiation angle. The apparatus compares the current measured distance and the stored distances, and determines whether a stationary object distance matching the current distance is present among the stored distances. The apparatus initially compares the shortest stationary object distance among the stored distances with the current distance, and upon determining that a stationary object distance matching the current distance is present, stops the comparison of the current distance and the stored distances that have not been compared with the current distance.

17 Claims, 17 Drawing Sheets

(51) Int. Cl.
    *G01S 17/42*     (2006.01)
    *G01S 17/46*     (2006.01)
    *G01S 17/50*     (2006.01)
    *G01S 17/87*     (2020.01)
    *G01S 13/56*     (2006.01)
    *G01S 7/41*      (2006.01)

(52) U.S. Cl.
    CPC .............. *G01S 17/42* (2013.01); *G01S 17/46* (2013.01); *G01S 17/50* (2013.01); *G01S 17/87* (2013.01)

(58) Field of Classification Search
    CPC .......... G01S 17/46; G01S 17/50; G01S 17/58; G01S 17/87; G01S 13/04; G01S 13/06; G01S 13/42; G01S 13/50; G01S 13/505; G01S 13/538; G01S 13/56; G01S 13/62; G01S 13/64; G01S 7/415; G01S 7/48; G01S 7/486; G01S 7/4876; G01S 7/4912; G01S 17/936; G01S 7/4817; G01S 13/931; G01S 1/02
    See application file for complete search history.

(56) References Cited

U.S. PATENT DOCUMENTS

| | | | | |
|---|---|---|---|---|
| 2014/0368493 | A1* | 12/2014 | Rogan | G01S 17/50 |
| | | | | 345/419 |
| 2016/0042622 | A1* | 2/2016 | Takiguchi | G01S 17/42 |
| | | | | 348/143 |
| 2016/0209499 | A1* | 7/2016 | Suzuki | G01S 7/4817 |
| 2016/0274239 | A1* | 9/2016 | Gupta | G01S 17/936 |

* cited by examiner

| STATIONARY OBJECT DISTANCE INFORMATION | | SEQUENCE NUMBER (N) | | | | | |
|---|---|---|---|---|---|---|---|
| | | 1 | 2 | 3 | 4 | 5 | ... |
| ANGLE NUMBER (M) | 1 | 16 | - | - | - | - | ... |
| | 2 | 15 | - | - | - | - | ... |
| | 3 | 14 | - | - | - | - | ... |
| | 4 | 13 | - | - | - | - | ... |
| | 5 | 13 | - | - | - | - | ... |
| | 6 | 13 | - | - | - | - | ... |
| | 7 | 14 | - | - | - | - | ... |
| | 8 | 15 | - | - | - | - | ... |
| | 9 | 16 | - | - | - | - | ... |
| | 10 | 17 | - | - | - | - | ... |

SORT IN ORDER FROM SHORTEST DISTANCE (FOUR SORTING PROCESS OPERATIONS)

SORT (THREE SORTING PROCESS OPERATIONS)

SORT (FOUR SORTING PROCESS OPERATIONS)

FIG.8A

DECREASE IN NUMBER OF STATIONARY OBJECTS (C1~C4→C1~C3)

COMPARISON PROCESS

| STATIONARY OBJECT DISTANCE INFORMATION | | SEQUENCE NUMBER (N) | | | | | |
|---|---|---|---|---|---|---|---|
| | | 1 | 2 | 3 | 4 | 5 | ... |
| ANGLE NUMBER (M) | 1 | 9 | 16 | – | – | – | ... |
| | 2 | 8 | 12 | 15 | – | – | ... |
| | 3 | 7 | 11 | 14 | – | – | ... |
| | 4 | 6 | 10 | 13 | – | – | ... |
| | 5 | 13 | – | – | – | – | ... |
| | 6 | 6 | 9 | 13 | – | – | ... |
| | 7 | 7 | 10 | 14 | – | – | ... |
| | 8 | 8 | 11 | 15 | – | – | ... |
| | 9 | 9 | 12 | 16 | – | – | ... |
| | 10 | 10 | 17 | – | – | – | ... |

⇔ COMPARE

DISTANCE REMAINING UNCHANGED FOR PRESCRIBED PERIOD OF TIME

| ANGLE NUMBER (M) | | |
|---|---|---|
| | 1 | 16 |
| | 2 | 12 |
| | 3 | 11 |
| | 4 | 10 |
| | 5 | 13 |
| | 6 | 6 |
| | 7 | 7 |
| | 8 | 8 |
| | 9 | 9 |
| | 10 | 10 |

FIG.8B

DELETION PROCESS

| STATIONARY OBJECT DISTANCE INFORMATION | | SEQUENCE NUMBER (N) | | | | | |
|---|---|---|---|---|---|---|---|
| | | 1 | 2 | 3 | 4 | 5 | ... |
| ANGLE NUMBER (M) | 1 | ~~9~~ | 16 | – | – | – | ... |
| | 2 | ~~8~~ | 12 | 15 | – | – | ... |
| | 3 | ~~7~~ | 11 | 14 | – | – | ... |
| | 4 | ~~6~~ | 10 | 13 | – | – | ... |
| | 5 | 13 | – | – | – | – | ... |
| | 6 | 6 | 9 | 13 | – | – | ... |
| | 7 | 7 | 10 | 14 | – | – | ... |
| | 8 | 8 | 11 | 15 | – | – | ... |
| | 9 | 9 | 12 | 16 | – | – | ... |
| | 10 | 10 | 17 | – | – | – | ... |

FIG.8C

SHIFTING PROCESS

| STATIONARY OBJECT DISTANCE INFORMATION | | SEQUENCE NUMBER (N) | | | | | |
|---|---|---|---|---|---|---|---|
| | | 1 | 2 | 3 | 4 | 5 | ... |
| ANGLE NUMBER (M) | 1 | 16 | – | – | – | – | ... |
| | 2 | 12 | 15 | – | – | – | ... |
| | 3 | 11 | 14 | – | – | – | ... |
| | 4 | 10 | 13 | – | – | – | ... |
| | 5 | 13 | – | – | – | – | ... |
| | 6 | 6 | 9 | 13 | – | – | ... |
| | 7 | 7 | 10 | 14 | – | – | ... |
| | 8 | 8 | 11 | 15 | – | – | ... |
| | 9 | 9 | 12 | 16 | – | – | ... |
| | 10 | 10 | 17 | – | – | – | ... |

} PERFORM SHIFTING PROCESS (rows 1–4)

FIG.9A
DECREASE IN NUMBER OF STATIONARY OBJECTS (C1~C4→C2, C4)
COMPARISON PROCESS

| STATIONARY OBJECT DISTANCE INFORMATION | | SEQUENCE NUMBER (N) | | | | | |
|---|---|---|---|---|---|---|---|
| | | 1 | 2 | 3 | 4 | 5 | ... |
| ANGLE NUMBER (M) | 1 | 9 | 16 | – | – | – | ... |
| | 2 | 8 | 12 | 15 | – | – | ... |
| | 3 | 7 | 11 | 14 | – | – | ... |
| | 4 | 6 | 10 | 13 | – | – | ... |
| | 5 | 13 | – | – | – | – | ... |
| | 6 | 6 | 9 | 13 | – | – | ... |
| | 7 | 7 | 10 | 14 | – | – | ... |
| | 8 | 8 | 11 | 15 | – | – | ... |
| | 9 | 9 | 12 | 16 | – | – | ... |
| | 10 | 10 | 17 | – | – | – | ... |

COMPARE

| DISTANCE REMAINING UNCHANGED FOR PRESCRIBED PERIOD OF TIME | | |
|---|---|---|
| ANGLE NUMBER (M) | 1 | 9 |
| | 2 | 8 |
| | 3 | 7 |
| | 4 | 6 |
| | 5 | 13 |
| | 6 | 13 |
| | 7 | 14 |
| | 8 | 15 |
| | 9 | 16 |
| | 10 | 17 |

FIG.9B
DELETION PROCESS

| STATIONARY OBJECT DISTANCE INFORMATION | | SEQUENCE NUMBER (N) | | | | | |
|---|---|---|---|---|---|---|---|
| | | 1 | 2 | 3 | 4 | 5 | ... |
| ANGLE NUMBER (M) | 1 | 9 | 16 | – | – | – | ... |
| | 2 | 8 | 12 | 15 | – | – | ... |
| | 3 | 7 | 11 | 14 | – | – | ... |
| | 4 | 6 | 10 | 13 | – | – | ... |
| | 5 | 13 | – | – | – | – | ... |
| | 6 | ~~6~~ | ~~9~~ | 13 | – | – | ... |
| | 7 | ~~7~~ | ~~10~~ | 14 | – | – | ... |
| | 8 | ~~8~~ | ~~11~~ | 15 | – | – | ... |
| | 9 | ~~9~~ | ~~12~~ | 16 | – | – | ... |
| | 10 | ~~10~~ | 17 | – | – | – | ... |

FIG.9C
SHIFTING PROCESS

| STATIONARY OBJECT DISTANCE INFORMATION | | SEQUENCE NUMBER (N) | | | | | |
|---|---|---|---|---|---|---|---|
| | | 1 | 2 | 3 | 4 | 5 | ... |
| ANGLE NUMBER (M) | 1 | 9 | 16 | – | – | – | ... |
| | 2 | 8 | 12 | 15 | – | – | ... |
| | 3 | 7 | 11 | 14 | – | – | ... |
| | 4 | 6 | 10 | 13 | – | – | ... |
| | 5 | 13 | – | – | – | – | ... |
| | 6 | 13 | – | – | – | – | ... |
| | 7 | 14 | – | – | – | – | ... |
| | 8 | 15 | – | – | – | – | ... |
| | 9 | 16 | – | – | – | – | ... |
| | 10 | 17 | – | – | – | – | ... |

PERFORM SHIFTING PROCESS

FIG.10

| STATIONARY OBJECT DISTANCE INFORMATION | SEQUENCE NUMBER (N) | | | | | |
|---|---|---|---|---|---|---|
| | 1 | 2 | 3 | 4 | 5 | ... |
| ANGLE NUMBER (M) → 1 | 9 | 16 | - | - | - | ... |
| 2 | 8 | 12 | 15 | - | - | ... |
| 3 | 7 | 11 | 14 | - | - | ... |
| 4 | 6 | 10 | 13 | - | - | ... |
| 5 | 13 | - | - | - | - | ... |
| 6 | 6 | 9 | 13 | - | - | ... |
| 7 | 7 | 10 | 14 | - | - | ... |
| 8 | 8 | 11 | 15 | - | - | ... |
| 9 | 9 | 12 | 16 | - | - | ... |
| 10 | 10 | 17 | - | - | - | ... |

| CURRENT DISTANCE INFORMATION | |
|---|---|
| ANGLE NUMBER (M) → 1 | 9 |
| 2 | 8 |
| 3 | 7 |
| 4 | 6 |
| 5 | 13 |
| 6 | 6 |
| 7 | 7 |
| 8 | 8 |
| 9 | 9 |
| 10 | 10 |

NUMBER OF COMPARISON OPERATIONS = 10 TIMES

COMPARATIVE TECHNOLOGY

COMPARATIVE TECHNOLOGY

COMPARATIVE TECHNOLOGY

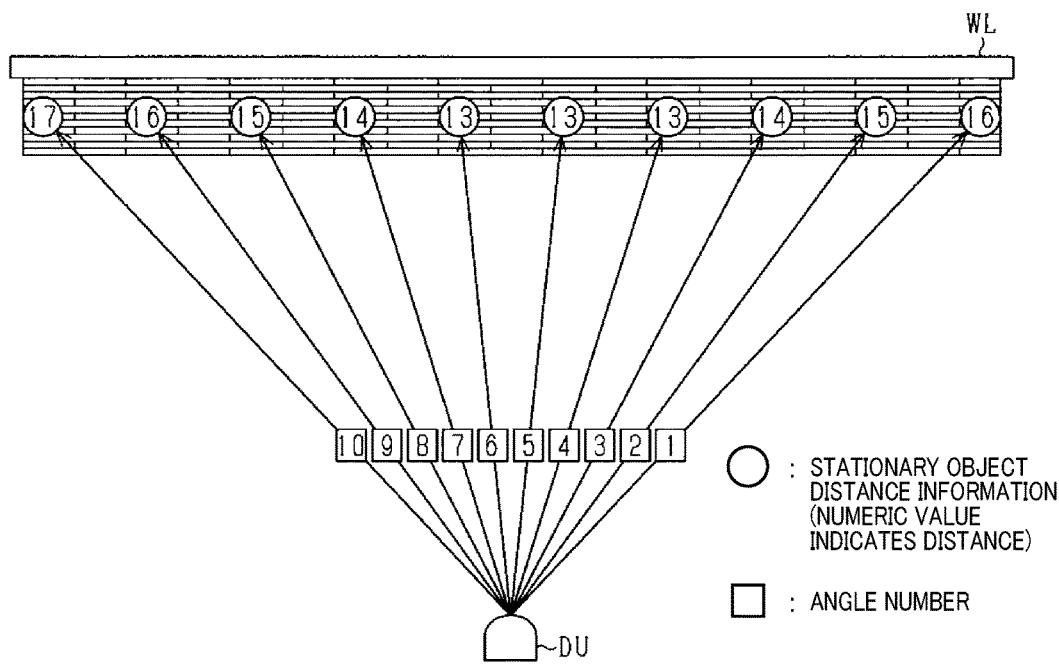

○ : STATIONARY OBJECT DISTANCE INFORMATION (NUMERIC VALUE INDICATES DISTANCE)

☐ : ANGLE NUMBER

| STATIONARY OBJECT DISTANCE INFORMATION | | |
|---|---|---|
| ANGLE NUMBER (M) | 1 | 16 |
| | 2 | 12 |
| | 3 | 11 |
| | 4 | 10 |
| | 5 | 13 |
| | 6 | 13 |
| | 7 | 14 |
| | 8 | 15 |
| | 9 | 16 |
| | 10 | 17 |

○ : STATIONARY OBJECT DISTANCE INFORMATION (NUMERIC VALUE INDICATES DISTANCE)

△ : CURRENT DISTANCE INFORMATION (NUMERIC VALUE INDICATES DISTANCE)

☐ : ANGLE NUMBER

OBJECT DETECTION APPARATUS AND OBJECT DETECTION PROGRAM

CROSS-REFERENCE TO RELATED APPLICATION

This application is based on and claims the benefit of priority from earlier Japanese Patent Application No. 2016-079114, filed Apr. 11, 2016, the description of which is incorporated herein by reference.

BACKGROUND

Technical Field

The present disclosure relates to an object detection apparatus and an object detection program for detecting an object in a detection area.

Related Art

Conventionally, an object detection apparatus that detects a moving object in a detection area based on reflected light of laser light is known (for example, refer to JP-A-2007-108129). In the object detection apparatus, the laser light is irradiated from a laser light irradiating unit at each of a plurality of irradiation angles. A method for detecting a moving object will be described hereafter, with reference to FIGS. 16A to 19B. FIGS. 16A to 19B show examples in which the laser light from the laser light irradiating unit is irradiated at each of ten irradiation angles. In addition, in FIGS. 16A to 19B, angle numbers 1 to 10 are assigned in correspondence to the irradiation angles. The numeric value of stationary object distance information indicates a measured distance to a detected object.

First, as shown in FIG. 16A, the object detection apparatus irradiates laser light from a laser light irradiating unit DU at each of ten irradiation angles. The object detection apparatus then measures the distance to a detected object for each angle number, based on reflected light of the irradiated laser light. Next, the object detection apparatus determines whether or not the measured distance has remained unchanged for a prescribed period of time, for each of the angle numbers 1 to 10. As shown in FIG. 16B, the object detection apparatus stores, in a storage unit thereof, the measured distance that is determined to have remained unchanged as a stationary object distance in association with the angle number. In FIG. 16A, a wall WL is present in the detection area. Therefore, the measured distance corresponding to each of the angle numbers 1 to 10 indicates the distance to the wall WL.

Subsequently, as shown in FIG. 17A, a vehicle C enters the detection area and the situation in the detection area changes. As shown in FIG. 17B, the object detection apparatus compares the current measured distance and the stationary object distance stored in the storage unit, and determines whether or not a distance matching the current measured distance is present among the stationary object distances stored in the storage unit, for each of the angle numbers 1 to 10. The object detection apparatus determines the objects detected at the angle numbers 1 and 5 to 10 corresponding to the current measured distances matching the stationary object distances as stationary objects. The object detection apparatus determines objects detected at the angle numbers 1 to 4 corresponding to the current measured distances that do not match the stationary object distances to be moving objects.

Subsequently, when the vehicle C is parked in the detection area, the object detection apparatus determines that the vehicle C is also a stationary object. Here, when a moving object enters the detection area and stops, and the number of stationary objects in the detection area increases, the stationary object distance of the newly added stationary object is required to be stored in the storage unit, rather than the stationary object distance stored in the storage unit being updated to the stationary object distance of the newly added stationary object, for the angle number at which the added stationary object is detected. In addition, the current measured distance and all stationary object distances stored in the storage unit are required to be compared, for all angle numbers. A reason for this is to prevent erroneous detection of a moving object in the detection area. An aspect in which an erroneous detection occurs will be described below.

FIGS. 18A and 18B show an example in which, when the vehicle C is added as a stationary object present in the detection area, the stationary object distances of the angle numbers 2 to 4 stored in the storage unit are updated to the stationary object distances of the angle numbers 2 to 4 corresponding to the vehicle C. As shown in FIGS. 19A and 19B, in the configuration in which the stationary object distance is updated, when the vehicle C subsequently moves and leaves the detection area, a determination is made that the stationary object distance stored in the storage unit and the current measured distance do not match, regarding the angle numbers 3 and 4.

As a result, regardless of the wall WL corresponding to the angle numbers 3 and 4 present beyond the vehicle C being a stationary object, the wall WL is erroneously detected as being a moving object. To prevent such erroneous detections, the stationary object distance of the newly added stationary object is required to be stored in the storage unit while keeping the stationary object distances acquired up to this point. In addition, the current measured distance and all stationary object distances stored in the storage unit are required to be compared, for each of the angle numbers 1 to 10.

However, in the configuration in which the stationary object distance of the newly added stationary object is stored in the storage unit while keeping the stationary object distances acquired up to this point, as the number of stationary objects present in the detection area increases, the number of stationary object distances to be compared with the current measured distance increases. As a result, the calculation load placed on the object detection apparatus may increase.

The above-described issue is not limited to the object detection apparatus that detect an object in a detection area based on reflected light of laser light, but may also similarly occur in an object detection apparatus that perform detection based on reflected waves of other electromagnetic waves.

SUMMARY

It is thus desired to provide an object detection apparatus that is capable of reducing calculation load.

A first exemplary embodiment provides an object detection apparatus that detects an object in a detection area based on reflected waves of electromagnetic waves irradiated from an irradiating unit. The object detection apparatus includes: a distance measuring unit that measures a distance to a detected object at each of a plurality of irradiation angles, based on the reflected waves of the electromagnetic waves irradiated from the irradiating unit at each irradiation angle; a storage unit that is capable of storing the distances measured by the distance measuring unit in association with the irradiation angles; a stationary-state determining unit that determines whether or not the distance measured by the distance measuring unit remains unchanged for a prescribed period of time, for each of the plurality of irradiation angles; a storing processing unit that stores, in the storage unit, the distance determined to have remained unchanged by the stationary-state determining unit as a stationary object distance in association with the irradiation angle; and a comparison determining unit that compares a current distance measured by the distance measuring unit and the stationary object distances stored in the storage unit for each of the plurality of irradiation angles, and determines whether or not a stationary object distance matching the current distance is present among the stationary object distances stored in the storage unit. In the configuration, the comparison determining unit initially compares the shortest stationary object distance among the stationary object distances stored in the storage unit with the current distance, for each of the plurality of irradiation angles, and upon determining that a stationary object distance matching the current distance is present, stops the comparison between the current distance and the stationary object distances that have not yet been compared with the current measured distance among the stationary object distances stored in the storage unit.

In the above-described configuration, the storing processing unit stores, in the storage unit, the distance determined to have remained unchanged by the stationary-state determining unit as the stationary object distance in association with the irradiation angle. Then, the comparison determining unit compares the current distance measured by the distance measuring unit and the stationary object distances stored in the storage unit, for each of the plurality of irradiation angles, and determines whether or not a stationary object distance matching the current distance is present among the stationary object distances stored in the storage unit.

Here, the electromagnetic waves irradiated from the above-described irradiating unit have a property such that the electromagnetic waves are unable to pass through objects. Therefore, for each irradiation angle, the distance measured by the distance measuring unit is the distance to an object present closest to the irradiating unit in the detection area. Consequently, for each irradiation angle, the distance measured by the distance measuring unit is the distance to the object present closest to the irradiating unit, as long as the position of the object present closest to the irradiating unit does not change.

In light of the foregoing, the comparison determining unit of the above-described exemplary embodiment initially compares the shortest stationary object distance among the stationary object distances stored in the storage unit to the current distance, for each of the plurality of irradiation angles. Then, upon determining that a stationary object distance matching the current distance is present, the comparison determining unit stops the comparison between the current distance and the stationary object distances stored in the storage unit that have not yet been compared with the current distance. Therefore, compared with a configuration in which the current measured distance is compared with all stationary object distances for each irradiation angle, even should the number of stationary objects in the detection area increase, the number of times that the current measured distance and the stationary object distance are compared can be reduced. Consequently, calculation load of the object detection apparatus can be reduced.

In the above-described configuration, the comparison determining unit may compare the current distance with the stationary object distances stored in the storage unit in order from the shortest stationary object distance, for each of the plurality of irradiation angles.

According to the above-described configuration, the comparison to the current distance by the comparison determining unit can be omitted for an object that is present beyond the object corresponding to the stationary object distance determined to match the current distance among the stationary object distances stored in the storage unit. Therefore, in cases in which the number of stationary objects present in a row in a direction from the irradiating unit towards the irradiation angle direction increases, increase in the number of comparison operations performed by the comparison determining unit can be suppressed. Consequently, increase in the calculation load of the object detection apparatus can be suppressed.

In the above-described configuration, the object detection apparatus may further include a deletion processing unit that deletes, from the storage unit, a stationary object distance that is shorter than the distance determined to have remained unchanged for a prescribed period of time by the stationary-state determining unit, among the stationary object distances stored in the storage unit that are associated with the irradiation angle corresponding to the distance.

The electromagnetic waves irradiated from the irradiating unit have a property such that the electromagnetic waves are unable to pass through objects. Therefore, the distance determined to have remained unchanged for a prescribed period of time by the stationary-state determining unit being longer than the shortest stationary object distance among the stationary object distances stored in the storage unit that are associated with the irradiation angle corresponding to the distance means that the object detected at the stationary object distance shorter than the distance determined to have remained unchanged for a prescribed period of time, among the stationary object distances stored in the storage unit, is no longer present.

In light of the foregoing, the above-described deletion processing unit deletes, from the storage unit, the stationary object distance that is shorter than the distance determined to have remained unchanged for a prescribed period of time by the stationary-state determining unit, among the stationary object distances stored in the storage unit that are associated with the irradiation angle corresponding to the distance. Therefore, when the number of stationary objects present in the detection area decreases after increasing, the number of stationary object distances to be compared with the current measured distance by the comparison determining unit can be reduced based on the number of stationary objects that has decreased. Consequently, the calculation load of the object detection apparatus can be reduced.

In the above-described configuration, the object detection apparatus may further include a deletion processing unit that deletes, from the storage unit, previously-stored stationary object distances that are shorter than the current distance measured by the distance measuring unit, for each irradiation angle.

The electromagnetic waves irradiated from the irradiating unit have a property such that the electromagnetic waves are unable to pass through objects. Therefore, the current distance measured by the distance measuring unit being longer than the shortest stationary object distance among the stationary object distances stored in the storage unit that are associated with the irradiation angle corresponding to the current distance means that the object detected at the stationary object distance shorter than the current distance, among the stationary object distances stored in the storage unit, is no longer present.

In light of the foregoing, the above-described deletion processing unit deletes, from the storage unit, the stationary object distance shorter than the current distance measured by the distance measuring unit, among the stationary object distances stored in the storage unit that are associated with the irradiation angle corresponding to the current distance. Therefore, after the stationary object distance is deleted from the storage unit, the number of stationary object distances to be compared with the distance measured by the distance measuring unit can be reduced based on the number of stationary objects that has decreased. Consequently, the calculation load of the object detection apparatus can be reduced.

A second exemplary embodiment provides an object detection apparatus that detects an object in a detection area based on reflected waves of electromagnetic waves irradiated from an irradiating unit. The object detection apparatus includes: a distance measuring unit that measures a distance to a detected object at each of a plurality of irradiation angles, based on the reflected waves of the electromagnetic waves irradiated from the irradiating unit at each irradiation angle; a storage unit that is capable of storing the distances measured by the distance measuring unit in association with the irradiation angles; a stationary-state determining unit that determines whether or not the distance measured by the distance measuring unit remains unchanged for a prescribed period of time, for each of the plurality of irradiation angles; a storing processing unit that stores, in the storage unit, the distance determined to have remained unchanged by the stationary-state determining unit as a stationary object distance in association with the irradiation angle; a comparison determining unit that compares a current distance measured by the distance measuring unit and the stationary object distances stored in the storage unit for each of the plurality of irradiation angles, and determines whether or not a stationary object distance matching the current distance is present among the stationary object distances stored in the storage unit; and a deletion processing unit that deletes, from the storage unit, the stationary object distance that is shorter than the distance determined to have remained unchanged for a prescribed period of time by the stationary-state determining unit, among the stationary object distances stored in the storage unit that are associated with the irradiation angle corresponding to the distance.

In the above-described configuration, the storing processing unit stores, in the storage unit, the distance determined to have remained unchanged by the stationary-state determining unit as a stationary object distance in association with the irradiation angle. Then, the comparison determining unit compares the current distance measured by the distance measuring unit and the stationary object distances stored in the storage unit, for each of the plurality of irradiation angles, and determines whether or not a stationary object distance matching the current distance is present among the stationary object distances stored in the storage unit.

Here, the electromagnetic waves irradiated from the irradiating unit have a property such that the electromagnetic waves are unable to pass through objects. Therefore, the distance determined to have remained unchanged for a prescribed period of time by the stationary-state determining unit being longer than the shortest stationary object distance among the stationary object distances stored in the storage unit that are associated with the irradiation angle corresponding to the distance means that the object detected at the stationary object distance shorter than the distance determined to have remained unchanged for a prescribed period of time, among the stationary object distances stored in the storage unit, is no longer present.

In light of the foregoing, the above-described deletion processing unit deletes, from the storage unit, the stationary object distance that is shorter than the distance determined to have remained unchanged for a prescribed period of time by the stationary-state determining unit, among the stationary object distances stored in the storage unit that are associated with the irradiation angle corresponding to the distance. Therefore, when the number of stationary objects present in the detection area decreases after increasing, the number of stationary object distances to be compared with the current measured distance by the comparison determining unit can be reduced based on the number of stationary objects that has decreased. Consequently, the calculation load of the object detection apparatus can be reduced.

A third exemplary embodiment provides an object detection apparatus that detects an object in a detection area based on reflected waves of electromagnetic waves irradiated from an irradiating unit. The object detection apparatus includes: a distance measuring unit that measures a distance to a detected object at each of a plurality of irradiation angles, based on the reflected waves of the electromagnetic waves irradiated from the irradiating unit at each irradiation angle; a storage unit that is capable of storing the distances measured by the distance measuring unit in association with the irradiation angles; a stationary-state determining unit that determines whether or not the distance measured by the distance measuring unit remains unchanged for a prescribed period of time, for each of the plurality of irradiation angles; a storing processing unit that stores, in the storage unit, the distance determined to have remained unchanged by the stationary-state determining unit as a stationary object distance in association with the irradiation angle; a comparison determining unit that compares a current distance measured by the distance measuring unit and the stationary object distances stored in the storage unit for each of the plurality of irradiation angles, and determines whether or not a stationary object distance matching the current distance is present among the stationary object distances stored in the storage unit; and a deletion processing unit that deletes, from the storage unit, the stationary object distance that is shorter than the current distance measured by the distance measuring unit, among the stationary object distances stored in the storage unit that are associated with the irradiation angle corresponding to the current distance.

In the above-described configuration, the storing processing unit stores, in the storage unit, the distance determined to have remained unchanged by the stationary-state determining unit as a stationary object distance in association with the irradiation angle. Then, the comparison determining unit compares the current distance measured by the distance measuring unit and the stationary object distances stored in the storage unit, for each of the plurality of irradiation angles, and determines whether or not a stationary object distance matching the current distance is present among the stationary object distances stored in the storage unit.

Here, the electromagnetic waves irradiated from the irradiating unit have a property such that the electromagnetic waves are unable to pass through objects. Therefore, the current distance measured by the distance measuring unit being longer than the shortest stationary object distance among the stationary object distances stored in the storage unit that are associated with the irradiation angle corresponding to the current distance means that the object detected at the stationary object distance shorter than the current distance, among the stationary object distances stored in the storage unit, is no longer present.

In light of the foregoing, the above-described deletion processing unit deletes, from the storage unit, the stationary object distance that is shorter than the current distance measured by the distance measuring unit, among the stationary object distances stored in the storage unit that are associated with the irradiation angle corresponding to the current distance. Therefore, after the stationary object distance is deleted from the storage unit, the number of stationary object distances to be compared with the distance measured by the distance measuring unit can be reduced based on the number of stationary objects that has decreased. Consequently, the calculation load of the object detection apparatus can be reduced.

BRIEF DESCRIPTION OF THE DRAWINGS

In the accompanying drawings:

FIGS. 8A, 8B, and 8C are diagrams of an example of a deletion process and a shifting process for stationary object distances when the number of stationary objects in the detection area decreases;

FIGS. 9A, 9B, and 9C are diagrams of an example of the deletion process and the shifting process for stationary object distances when the number of stationary objects in the detection area decreases;

FIG. 10 is a diagram of selection of the shortest stationary object distance as a stationary object distance to be initially compared with a current measured distance;

FIGS. 16A and 16B are diagrams an overview of a moving object detection process of a conventional technology;

DESCRIPTION OF THE EMBODIMENTS

An embodiment in which an object detection apparatus of the present disclosure is applied to a laser sensor apparatus will hereinafter be described with reference to the drawings. For example, the laser sensor apparatus is used for security purposes to monitor suspicious individuals, vehicles, and the like entering a detection area.

Figure 1:
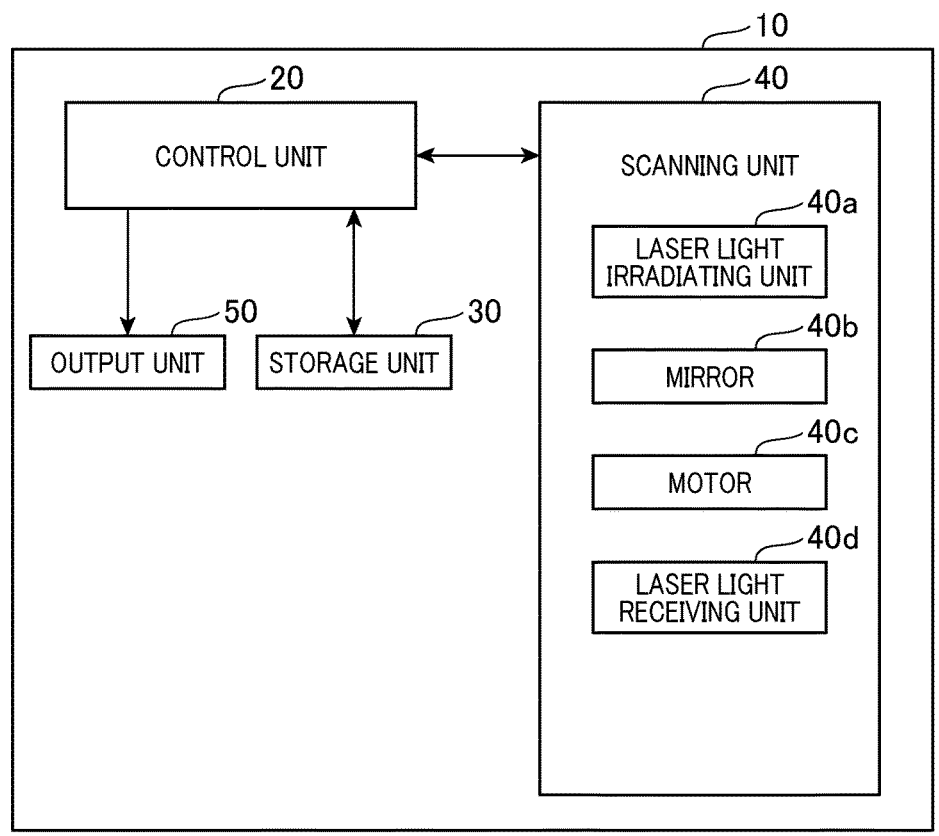
FIG. 1 is an overall configuration diagram of a laser sensor apparatus according to an embodiment.

As shown in FIG. 1, a laser sensor apparatus 10 includes a control unit 20, a storage unit 30, a scanning unit 40, and an output unit 50. For example, the laser sensor apparatus 10 is provided on an outer wall of a building. The control unit 20 is configured by a microcomputer that includes a central processing unit (CPU). The control unit 20 performs a moving object detection process that includes a process for controlling the scanning unit 40, by running a computer program stored in the storage unit 30. The storage unit 30 is a random-access memory (RAM) or the like. According to the present embodiment, the moving object detection process is actualized through software, by the computer program run by the control unit 20. The computer program can be installed in the storage unit 30 over a communication network or through a computer-readable recording medium on which the computer program is recorded.

The scanning unit 40 includes a laser light irradiating unit 40a, a mirror 40b, and a motor 40c. The laser light irradiating unit 40a irradiates laser light. The mirror 40b reflects the laser light irradiated from the laser light irradiating unit 40a towards a detection area. The motor 40c rotatably drives the mirror 40b. Each time the motor 40c rotates the mirror 40b by a predetermined angle, the laser light irradiated from the laser light irradiating unit 40a is irradiated towards the detection area. As a result, the laser light is irradiated at each of a plurality of irradiation angles over a predetermined irradiation angle range (such as a range of several tens of degrees up to a range of 360 degrees). Specifically, the laser light is irradiated at each of the plurality of irradiation angles on a horizontal plane at a predetermined height position from the ground surface. The angle interval between the irradiation angles is set to an arbitrary value ranging, for example, from 0.1 degrees to 1 degree. The angle intervals may be set to the same value or to differing values.

The mirror 40b receives light reflected by an object present in the detection area. The received reflected light is inputted to a laser light receiving unit 40d of the scanning unit 40. The configuration of the scanning unit 40 may be other than the foregoing. For example, the scanning unit 40 may be configured such the mirror 40b is not used and the laser light irradiating unit 40a itself is driven.

The output unit 50 outputs detection result information on a moving object in the detection area in a manner enabling notification to an observer.

Next, the moving object detection process performed by the control unit 20 will be described with reference to FIG. 2. The process is repeatedly performed, for example, at a predetermined processing cycle.

Figures 3A, 3B:
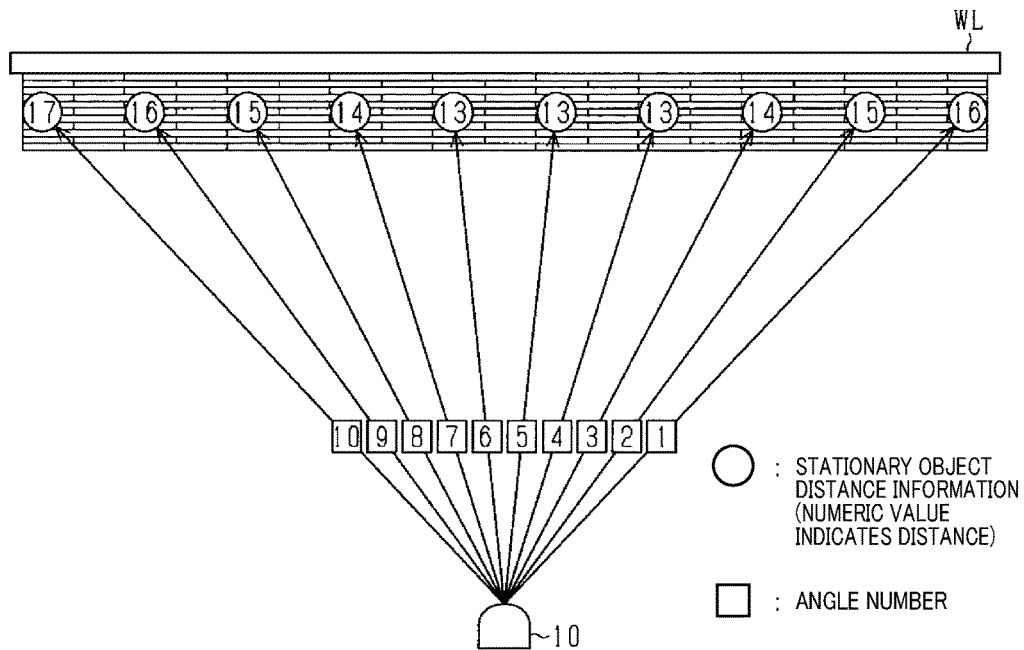
FIGS. 3A and 3B are diagrams of a state in which a wall in a detection area is determined to be a stationary object.

In the series of processes, first, at step S10, the control unit 20 acquires reflected light data of the laser light irradiated from the laser light irradiating unit 40a at each of the plurality of irradiation angles. The control unit 20 then performs a distance measurement process to measure the distance to a detected object at each irradiation angle, based on the acquired reflected light data. According to the present embodiment, as shown in FIG. 3A, ten irradiation angles are used as the plurality of irradiation angles. In FIGS. 3A and 3B, angle numbers respectively corresponding to the ten irradiation angles are denoted.

The distance measurement process will be described in detail. The laser light irradiating unit 40a irradiates the laser light, while the mirror 40b is driven to rotate by a predetermined angle, from the irradiation angle corresponding to the angle number 1 to the irradiation angle corresponding to the angle number 10. The laser light receiving unit 40d receives the reflected light. The control unit 20 then measures the distance to the detected object for each of the angle numbers 1 to 10, based on a period of time required from irradiation of the laser light to reception of the reflected light. The storage unit 30 temporarily stores the measured distance therein in association with the irradiation angle, for the process at step S11. According to the present embodiment, the process at step S10 corresponds to a distance measuring unit and a distance measurement process.

At subsequent step S11, the control unit 20 determines whether or not the distance measured in the distance measurement process has remained unchanged for a prescribed period of time, for each of the angle numbers 1 to 10. Specifically, for example, the control unit 20 determines whether or not the measured distance has remained unchanged over a plurality of processing cycles. Here, for example, the prescribed period of time is set to a period of time over which a pedestrian can be recognized as a moving object (such as two seconds). According to the present embodiment, the process at step S11 corresponds to a stationary-state determining unit and a stationary-state determination process.

When determined that a measured distance that has remained unchanged for a prescribed period of time is present, the control unit 20 proceeds to step S12. At step S12, the control unit 20 determines whether or not the measured distance determined to have remained unchanged for a prescribed period of time at step S11 is shorter than the shortest stationary object distance among the stationary object distances stored in the storage unit 30 that are associated with the angle number corresponding to the measured distance.

When determined that the measured distance determined to have remained unchanged is shorter than the shortest stationary object distance at step S12, the control unit 20 proceeds to step S13. The control unit 20 stores, in the storage unit 30, the distance determined to have remained unchanged at S11 and that has not yet been stored in the storage unit 30 as the stationary object distance in association with the angle number. FIG. 3B shows an example in which only the wall WL is present in the detection area, and the distance from the laser sensor apparatus 10 to the wall WL for each of the angle numbers 1 to 10 is stored in the storage unit 30 as the stationary object distance. According to the present embodiment, the process at step S13 corresponds to a storing processing unit and a storing process.

At subsequent step S14, the control unit 20 performs a sorting process to rearrange the stationary object distances stored in the storage unit 30 in order from the shortest stationary object distance, for the angle number corresponding to the distance determined to have remained unchanged for a prescribed period of time. The sorting process will be described below, based on an example in which the number of stationary objects in the detection area gradually increases, with reference to FIGS. 4A to 7C.

Figures 4A, 4B, 4C:
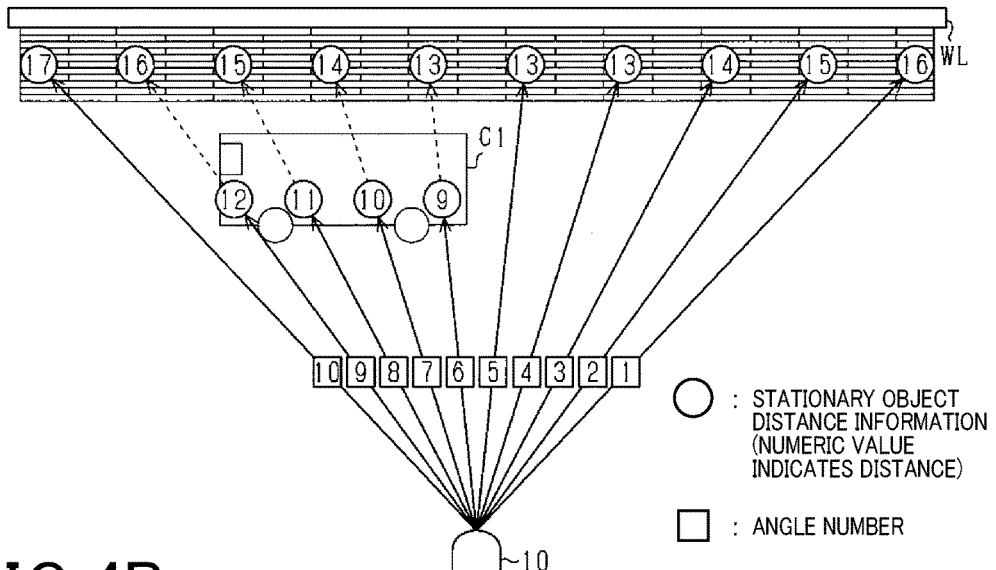
FIGS. 4A, 4B, and 4C are diagrams of a state in which the wall and a single parked vehicle in the detection area are determined to be stationary objects.

As shown in FIG. 4A, a first vehicle C1 enters the detection area and is parked in the detection area. In this case, at step S11, the control unit 20 determines that the measured distances corresponding to the angle numbers 6 to 9 have remained unchanged for a prescribed period of time. Then, at step S12, the control unit 20 determines that the measured distance determined to have remained unchanged at step S11 is shorter than the shortest stationary object distance among the stationary object distances stored in the storage unit 30, for each of the angle numbers 6 to 9. Therefore, as shown in FIG. 4B, at step S13, the measured distances corresponding to the angle numbers 6 to 9 are stored as stationary object distances in association with the angle numbers.

Then, as shown in FIG. 4C, the control unit 20 performs the sorting process to rearrange the stationary object distances in order from the shortest stationary object distance for each of the angle numbers 6 to 9. In the example shown in FIG. 4C, the control unit 20 performs the sorting process four times because the stationary object distances corresponding to four angle numbers are stored in the storage unit 30.

Figures 5A, 5B, 5C:
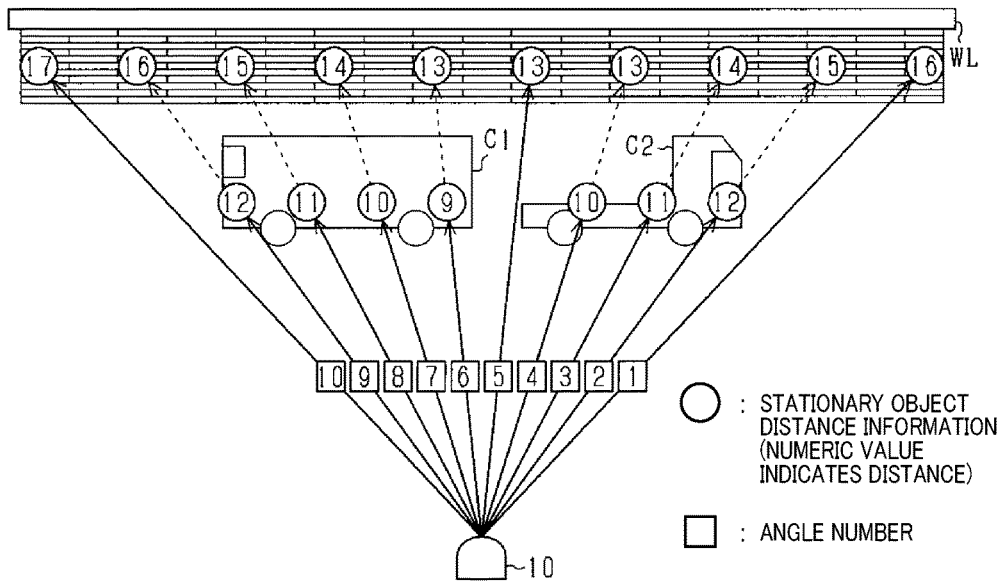
FIGS. 5A, 5B, and 5C are diagrams of a state in which the wall and two parked vehicles in the detection area are determined to be stationary objects.

Subsequently, as shown in FIG. 5A, a second vehicle C2 enters the detection area and is parked in the detection area. In this case, at step S11, the control unit 20 determines that the measured distances corresponding to the angle numbers 2 to 4 have remained unchanged for a prescribed period of time. Then, at step S12, the control unit 20 determines that the measured distance determined to have remained unchanged at step S11 is shorter than the shortest stationary object distance among the stationary object distances stored in the storage unit 30, for each of the angle numbers 2 to 4. Therefore, as shown in FIG. 5B, at step S13, the measured distances corresponding to the angle numbers 2 to 4 are stored as stationary object distances in association with the angle numbers.

Then, as shown in FIG. 5C, the control unit 20 performs the sorting process to rearrange the stationary object distances in order from the shortest stationary object distance for each of the angle numbers 2 to 4. In the example shown in FIG. 5C, the control unit 20 performs the sorting process three times because the stationary object distances corresponding to three angle numbers are stored in the storage unit 30.

Figures 6A, 6B, 6C:
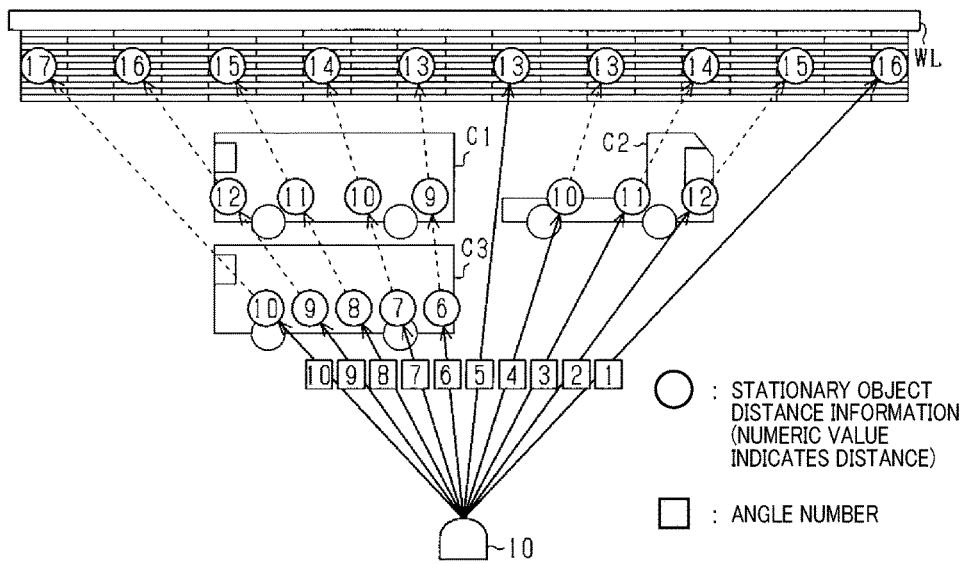
FIGS. 6A, 6B, and 6C are diagrams of a state in which the wall and three parked vehicles in the detection area are determined to be stationary objects.

Subsequently, as shown in FIG. 6A, a third vehicle C3 enters the detection area and is parked in the detection area. In this case, at step S11, the control unit 20 determines that the measured distances corresponding to the angle numbers 6 to 10 have remained unchanged for a prescribed period of time. Then, at step S12, the control unit 20 determines that the measured distance determined to have remained unchanged at step S11 is shorter than the shortest stationary object distance among the stationary object distances stored in the storage unit 30, for each of the angle numbers 6 to 10. Therefore, as shown in FIG. 6B, at step S13, the measured distances corresponding to the angle numbers 6 to 10 are stored as stationary object distances in association with the angle numbers.

Then, as shown in FIG. 6C, the control unit 20 performs the sorting process to rearrange the stationary object distances in order from the shortest stationary object distance for each of the angle numbers 6 to 10. In the example shown in FIG. 6C, the control unit 20 performs the sorting process five times because the stationary object distances corresponding to five angle numbers are stored in the storage unit 30.

Figures 7A, 7B, 7C:
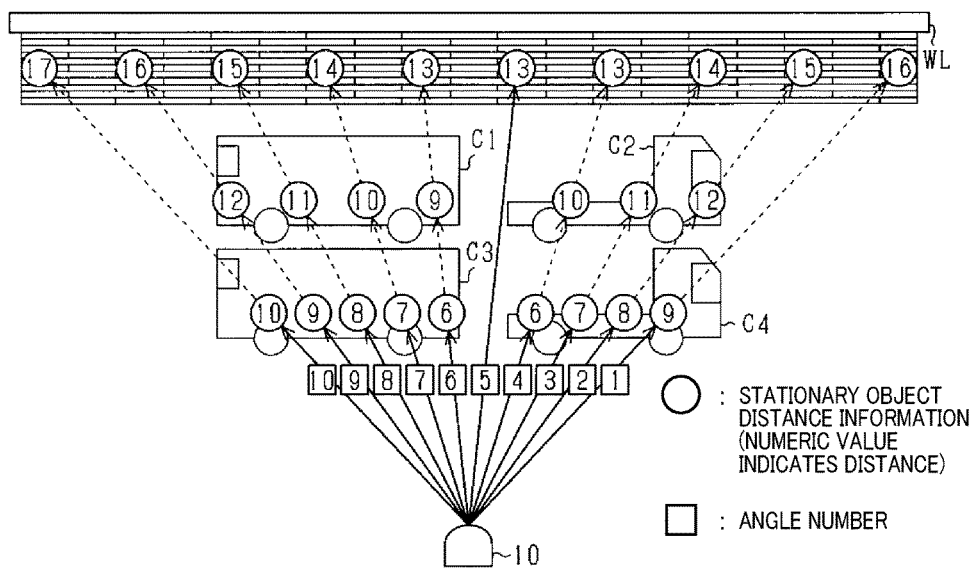
FIGS. 7A, 7B, and 7C are diagrams of a state in which the wall and four parked vehicles in the detection area are determined to be stationary objects.

Subsequently, as shown in FIG. 7A, a fourth vehicle C4 enters the detection area and is parked in the detection area. In this case, at step S11, the control unit 20 determines that the measured distances corresponding to the angle numbers 1 to 4 have remained unchanged for a prescribed period of time. Then, at step S12, the control unit 20 determines that the measured distance determined to have remained unchanged at step S11 is shorter than the shortest stationary object distance among the stationary object distances stored in the storage unit 30, for each of the angle numbers 1 to 4. Therefore, as shown in FIG. 7B, at step S13, the measured distances corresponding to the angle numbers 1 to 4 are stored as stationary object distances in association with the angle numbers.

Then, as shown in FIG. 7C, the control unit 20 performs the sorting process to rearrange the stationary object distances in order from the shortest stationary object distance for each of the angle numbers 1 to 4. In the example shown in FIG. 7C, the control unit 20 performs the sorting process four times because the stationary object distances corresponding to four angle numbers are stored in the storage unit 30.

Figure 2:
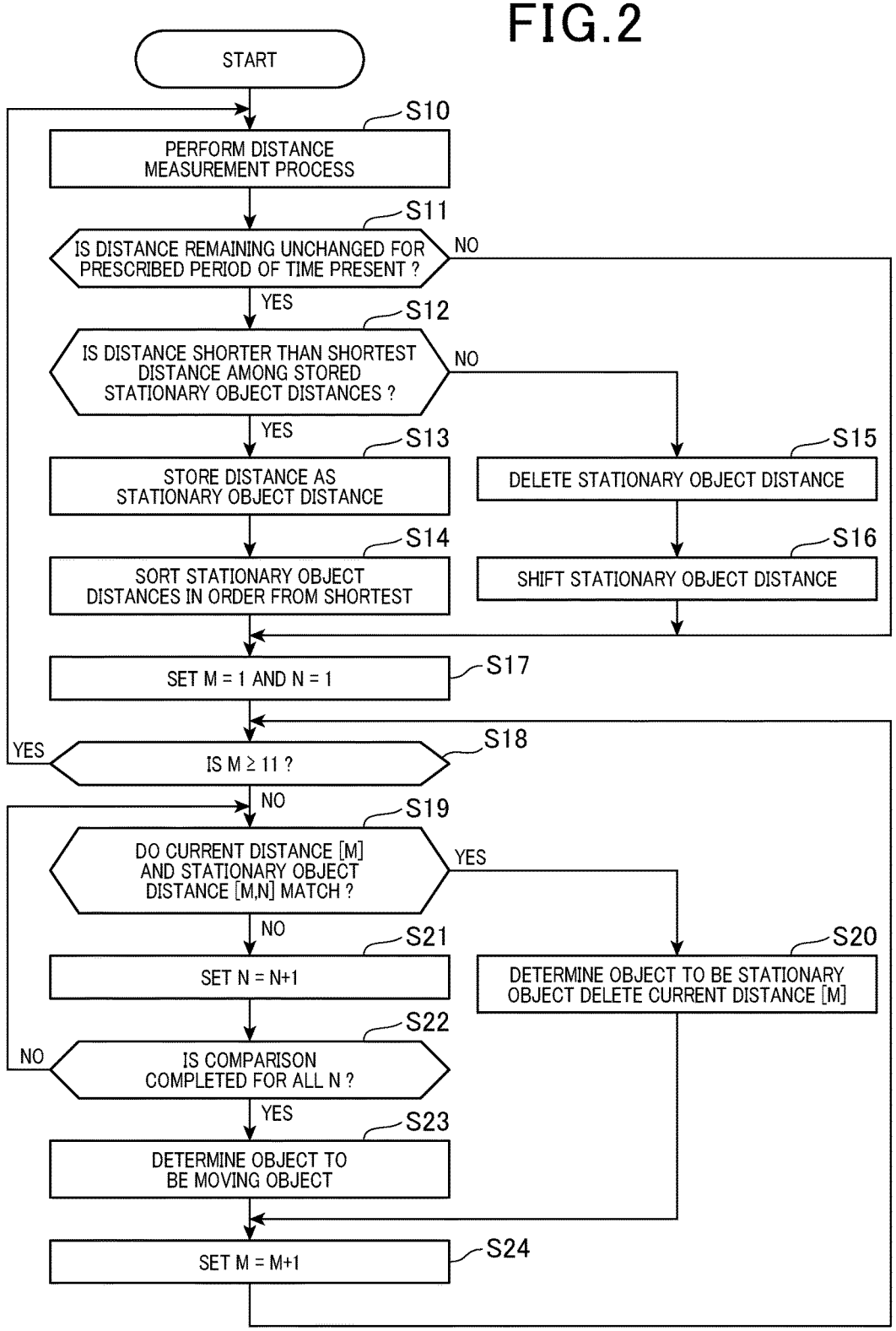
FIG. 2 is a flowchart of the steps in a moving object detection process.

Returning to the description with reference to FIG. 2, above, when determined at step S12 that the distance determined to have remained unchanged for a prescribed period of time at step S11 is longer than the shortest stationary object distance among the stationary object distances stored in the storage unit 30 and associated with the angle number corresponding to the distance determined to have remained unchanged, the control unit 20 performs the processes at steps S15 and S16. At step S15, the control unit 20 performs a deletion process for the stationary object distances stored in the storage unit 30. At step S16, the control unit 20 performs a shifting process for the stationary object distances stored in the storage unit 30. The deletion process and the shifting process will be described below, based on an example in which the number of stationary objects in the detection area decreases, with reference to FIGS. 8A to 9C.

First, an example in which, of the four vehicles C1 to C4 parked in the detection area, only the fourth vehicle C4 leaves the detection area will be described with reference to FIGS. 8A to 8C.

The information on the stationary object distances shown in FIG. 8A is the same as the information on the stationary object distances shown in FIG. 7C. Here, because the fourth vehicle C4 has left the detection area, as shown in FIG. 8A, the control unit 20 determines that the measured distances 16, 12, 11, and 10 that have been determined to have remained unchanged for a prescribed period of time at step S11 are longer than the shortest stationary object distances 9, 8, 7, and 6 among the stationary object distances stored in the storage unit 30 for the angle numbers 1, 2, 3, and 4. Therefore, as shown in FIG. 8B, the control unit 20 performs the deletion process in which the stationary object distances shorter than the distances determined to have remained unchanged for a prescribed period of time, among the stationary object distances stored in the storage unit 30, are deleted from the storage unit 30, for the angle numbers 1, 2, 3, and 4.

When the stationary object distances corresponding to the angle numbers 1 to 4 are deleted from the storage unit 30 in the deletion process, no stationary object distances are stored in sequence number 1 corresponding to the angle numbers 1 to 4. Therefore, as shown in FIG. 8C, the control unit 20 performs the shifting process in which the stationary object distances in sequence number 2 and subsequent columns are shifted towards the sequence number 1 side, for the angle numbers 1 to 4.

Next, an example in which, of the four vehicles C1 to C4 parked in the detection area, only the first and third vehicles C1 and C3 leave the detection area will be described with reference to FIGS. 9A to 9C.

The information on the stationary object distances shown in FIG. 9A is the same as the information on the stationary object distances shown in FIG. 7C. Here, because the first vehicle C1 and the third vehicle C3 have left the detection area, as shown in FIG. 9A, the control unit 20 determines that the measured distances 13, 14, 15, 16, and 17 that have been determined to have remained unchanged for a prescribed period of time at step S11 are longer than the shortest stationary object distances 6, 7, 8, 9, and 10 among the stationary object distances stored in the storage unit 30, for the angle numbers 6, 7, 8, 9, and 10. Therefore, as shown in FIG. 9B, the control unit 20 deletes, from the storage unit 30, the stationary object distances shorter than the distances determined to have remained unchanged for a prescribed period of time, among the stationary object distances stored in the storage unit 30, for the angle numbers 6, 7, 8, 9, and 10.

When the stationary object distances corresponding to the angle numbers 6 to 9 are deleted from the storage unit 30 in the deletion process, no stationary object distances are stored in the sequence numbers 1 and 2 corresponding to the angle numbers 6 to 9. Therefore, as shown in FIG. 9C, the control unit 20 performs the shifting process in which the stationary object distances in sequence number 3 and subsequent columns are shifted towards the sequence number 1 side, for the angle numbers 6 to 9. In addition, when the stationary object distance corresponding to the angle number 10 is deleted from the storage unit 30 in the deletion process, no stationary object distance is stored in the sequence number 1 corresponding to the angle number 10. Therefore, as shown in FIG. 9C, the control unit 20 performs the shifting process in which the stationary object distances in the sequence number 2 and subsequent columns are shifted towards the sequence number 1 side, for the angle number 10.

In the process at step S15, the longest stationary object distance among the stationary object distances stored in the storage unit 30 for each angle number remains in the storage unit 30 without being deleted.

Returning to the description with reference to FIG. 2, above, upon completing the process at step S14 or step S16, or when determined NO at step S11, the control unit 20 performs a comparison determination process at steps S17 to S24. Specifically, at step S17, the control unit 20 resets each of an angle number M and a sequence number N to 1.

At subsequent step S18, the control unit 20 determines whether or not the angle number M has reached 11 or greater, 11 being a value obtained by 1 being added to the number of irradiation angles. The control unit 20 performs this process to determine whether or not a comparison of the current distances measured in the distance measurement process at step S10 and the stationary object distances stored in the storage unit 30 has been completed for all of the angle numbers.

When determined YES at step S18, the control unit 20 proceeds to step S10 and performs the distance measurement process of the next processing cycle. Meanwhile, when determined NO at step S18, the control unit proceeds to step S19. The control unit 20 determines whether or not the current measured distance corresponding to the angle number M matches the stationary object distance corresponding to the angle number M and the row number N.

When determined that the current measured distance and the stationary object distance match at step S19, the control unit 20 proceeds to step S20. The control unit 20 determines that the object detected at the position away from the laser sensor apparatus 10 by the current measured distance is a stationary object, for the angle number M. The control unit 20 then deletes the current measured distance corresponding to the angle number M.

Meanwhile, when determined that the current measured distance and the stationary object distance do not match at step S19, the control unit 20 proceeds to step S21 and increments the row number N by 1. Then, at step S22, the control unit 20 determines whether or not the comparison between the current measured distance and all pieces of stationary object information stored in the storage unit 30 for the angle number M has been completed. When determined NO at step S22, the control unit 20 proceeds to step S19. When determined YES at step S22, the control unit 20 proceeds step S23. At step S23, the control unit 20 determines that the object detected at the position away from the laser sensor apparatus 10 by the current measured distance is a moving object, for the angle number M. The output unit 50 outputs the detection result information including position information of the moving object in the detection area based on the irradiation angle at which the moving object is detected and the measured distance at the irradiation angle at which the moving object is detected.

Upon completing the process at steps S20 or S23, the control unit 20 proceeds to step S24 and increments the angle number M by 1. Subsequently, the control unit 20 proceeds to step S18.

In the moving object detection process described above, for example, when four vehicles are parked in the detection area as shown in FIG. 7A, above, the current measured distance is compared only with the stationary object distance in the sequence number 1, for each of the angle numbers 1 to 10, as shown in FIG. 10.

Next, the effects of the moving object detection process according to the present embodiment will be described with reference to FIGS. 11 and 12. Here, in FIGS. 11 and 12, a state in which the number of parked vehicles in the detection area gradually increases, as shown in FIGS. 4 to 7, above, is assumed.

Figure 11:
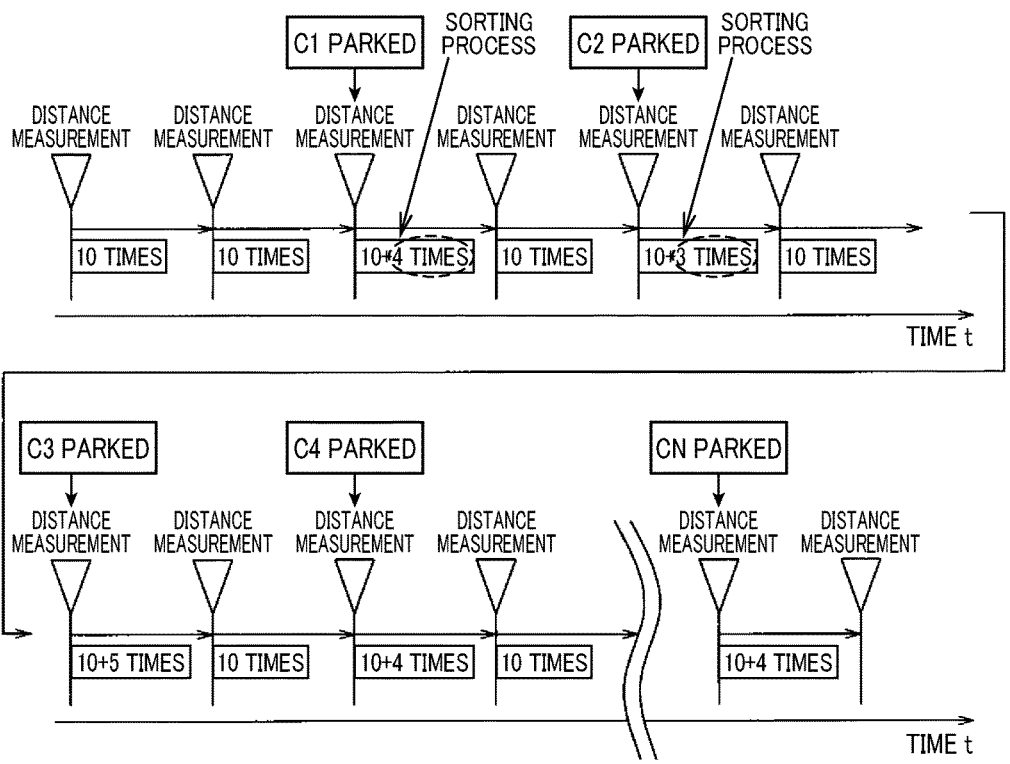
FIG. 11 is a diagram of the effect of reducing calculation load of the moving object detection process.
Figure 12:
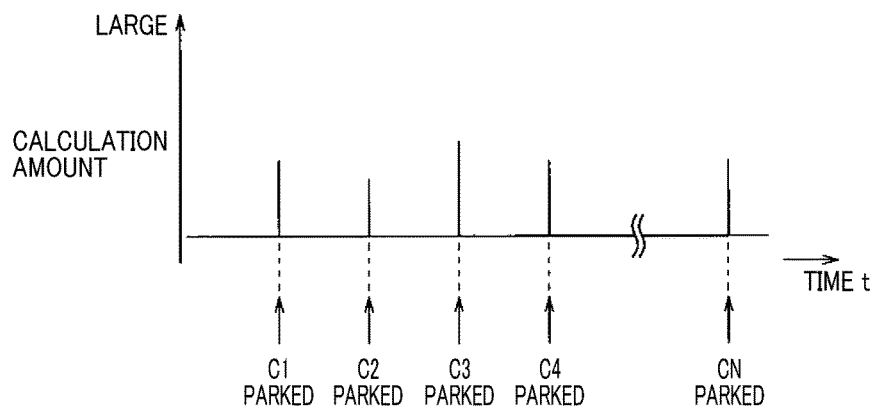
FIG. 12 is a diagram of the effect of reducing calculation load of the moving object detection process.

As shown in FIG. 11, the distance measurement process is performed at every predetermined processing cycle. The number of calculation operations increases as a result of the sorting processes being performed, only when the number of parked vehicles in the detection area increases (see FIG. 12). Specifically, the sorting process is performed four times when the first vehicle C1 is parked in the detection area. The sorting process is further performed three times when the second vehicle C2 is parked in the detection area. Subsequently, the sorting process is performed five times when the third vehicle C3 is parked in the detection area. The sorting process is further performed four times when the fourth vehicle C4 is parked in the detection area. FIG. 11 shows that the sorting process is performed four times when an Nth vehicle (N being an integer of 5 or greater) is subsequently parked.

As shown in FIG. 11, according to the present embodiment, even when the number of stationary objects in the detection area increases, the sorting process is performed for each angle number, and the current measured distance and the stationary object distance in the sequence number 1 are initially compared. Consequently, after the sorting process, the comparison between the current measurement distance and the stationary object distance is performed ten times. The processes to be calculated can be completed within the processing cycle.

Next, a moving object detection process of a comparative technology will be described with reference to FIGS. 13A to 15. Here, the moving object detection process of the comparative technology is that in which the sorting process is eliminated from the moving object detection process according to the present embodiment.

Figures 13A, 13B:
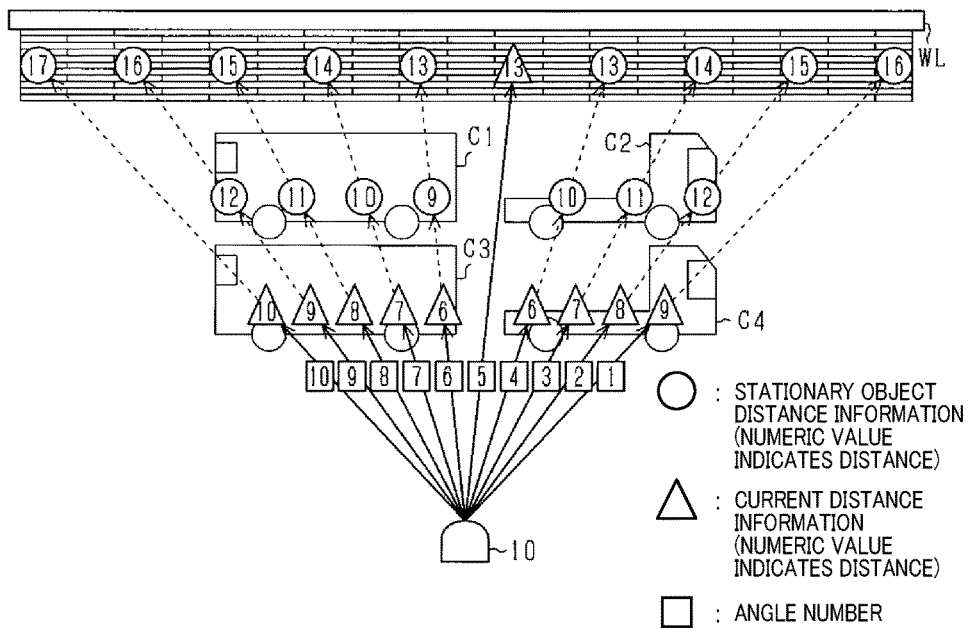
FIGS. 13A and 13B are diagrams of an overview of a moving object detection process of a comparative technology.
Figure 14:
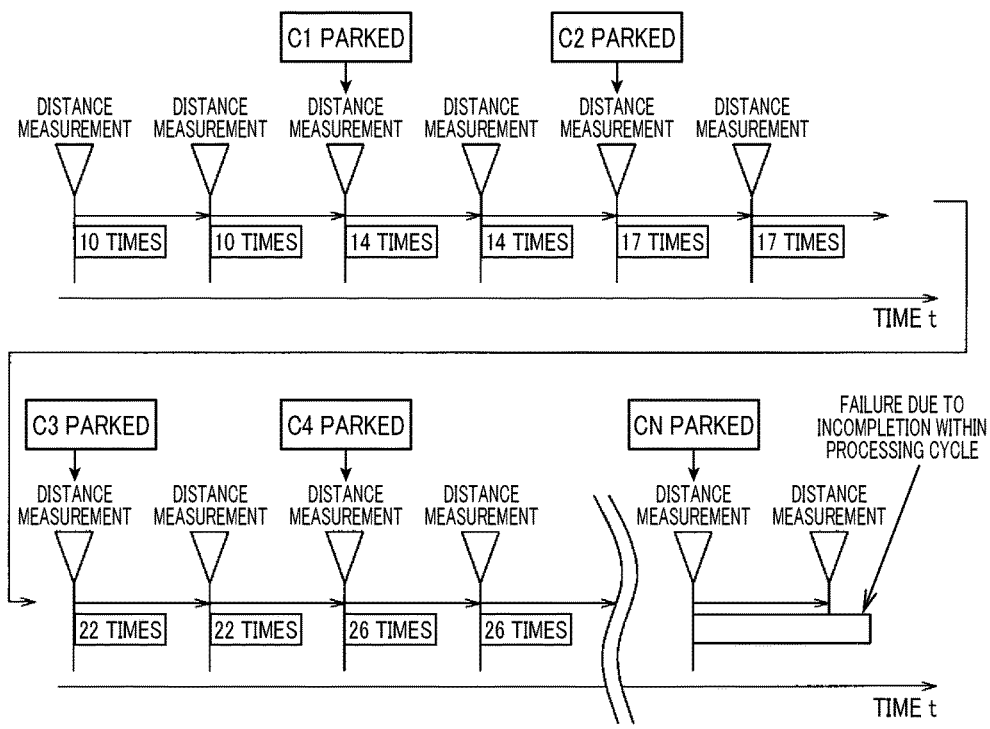
FIG. 14 is a diagram of the increase in calculation load of the moving object detection process in the comparative technology.
Figure 15:
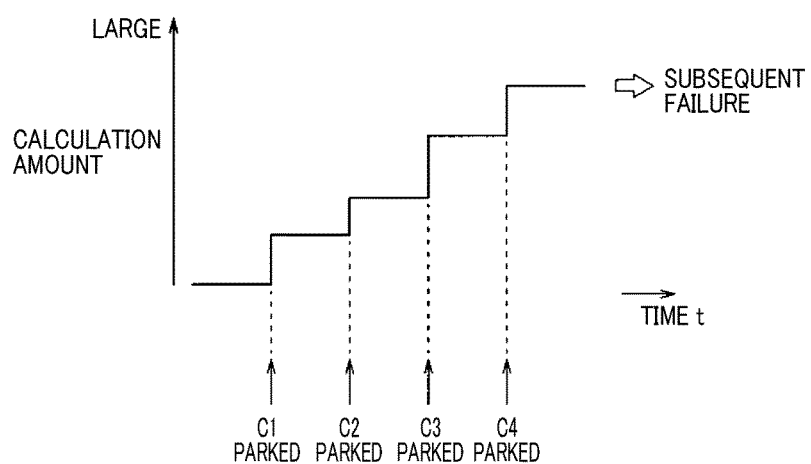
FIG. 15 is a diagram of the increase in calculation load of the moving object detection process in the comparative technology.
Figure 17A:
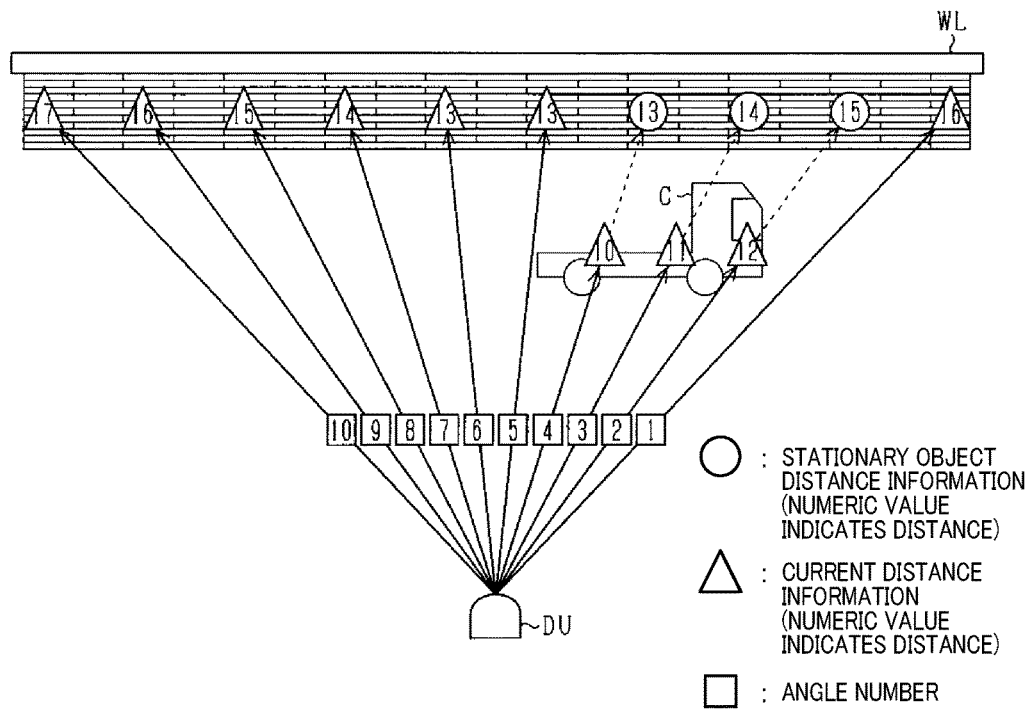
FIGS. 17A and 17B are diagrams of an overview of the moving object detection process of the conventional technology.
Figure 17B:
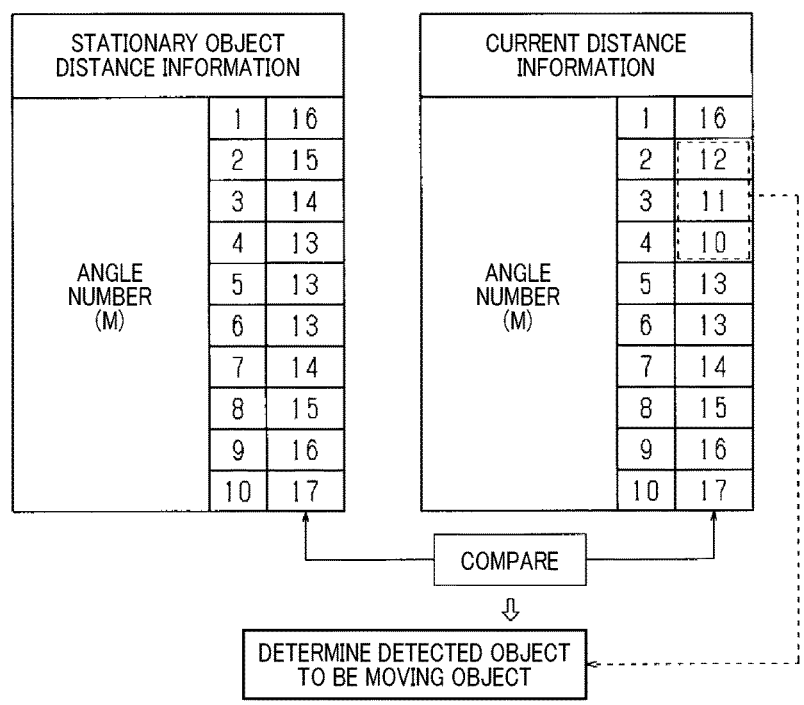
Figures 18A, 18B:
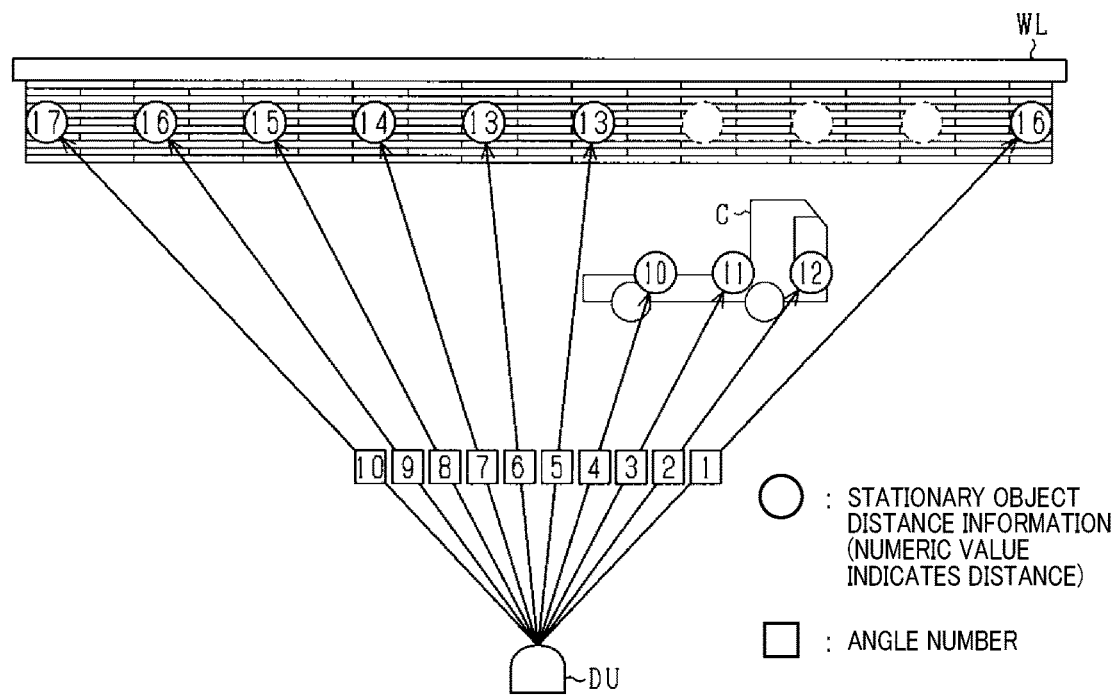
FIGS. 18A and 18B are diagrams of an overview of the moving object detection process of the conventional technology.
Figure 19A:
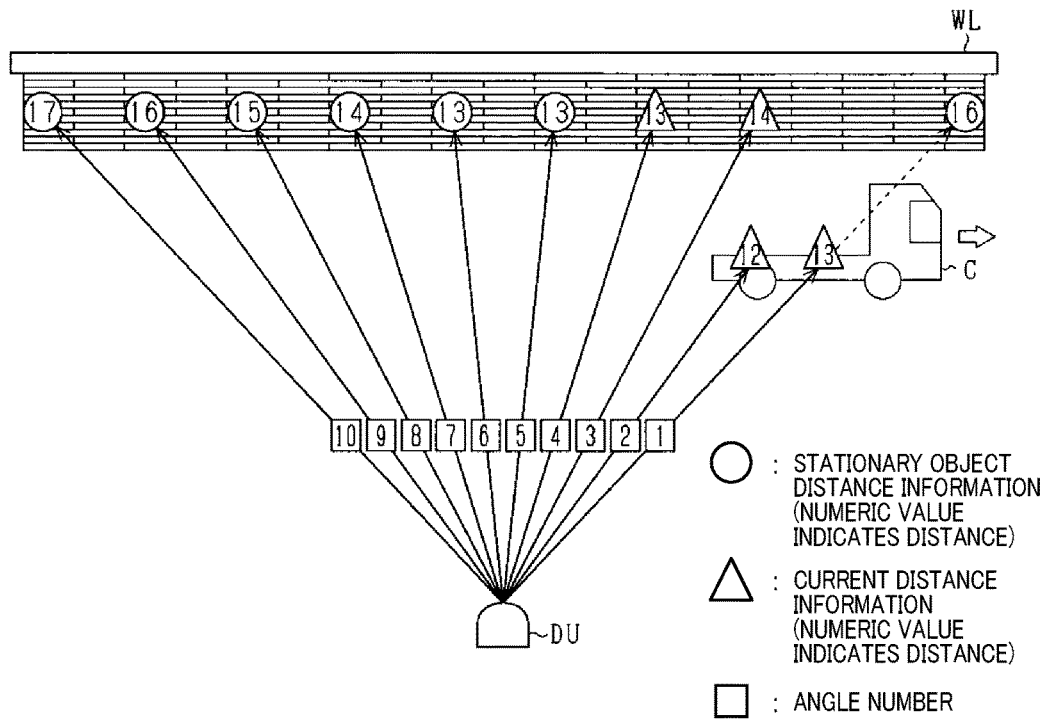
FIGS. 19A and 19B are diagrams of an overview of the moving object detection process of the conventional technology.
Figure 19B:
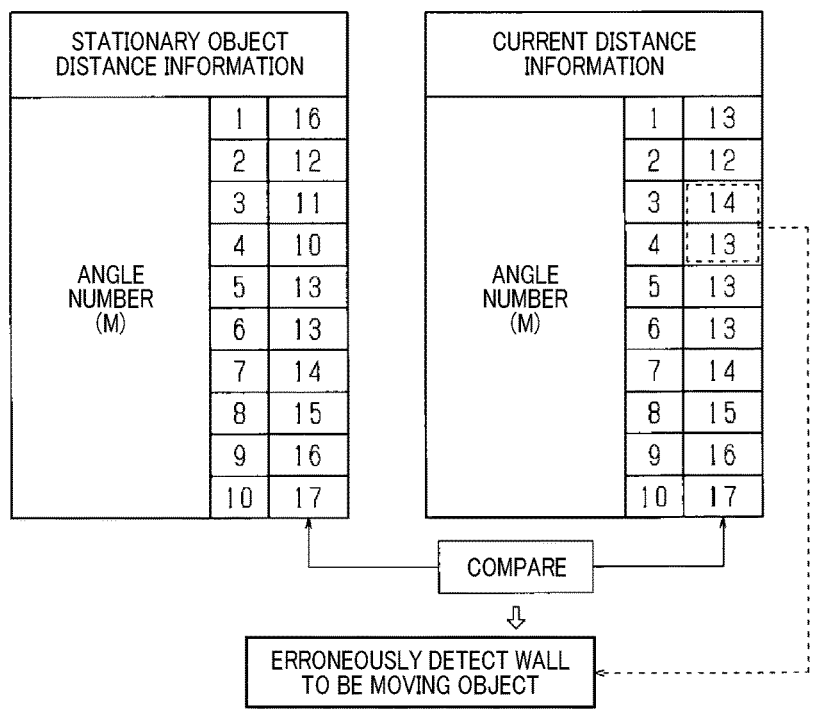

As shown in FIGS. 13A and 13B, because the sorting process is not performed, in the state in which four vehicles are parked in the detection area, all of the stationary object distances stored in the storage unit 30 and the current measured distance are required to be compared, for each of the angle numbers 1 to 10. In this case, as shown in FIGS. 14 and 15, as the number of parked vehicles in the detection area increases, the number of comparison operations also increases. As a result, the comparison calculation cannot be completed within the processing cycle. The actual calculation load placed on the control unit 20 exceeds the processing capability of the control unit 20. The calculation for the moving object detection process fails.

According to the present embodiment described above, the following effects can be achieved.

For each of the angle numbers 1 to 10, the shortest stationary object distance among the stationary object distances stored in the storage unit 30 and the current measured distance are initially compared. Then, when determined that a stationary object distance matching the current measured distance is present, the control unit 20 stops the comparison between the current measured distance and stationary object distances that have not yet been compared with the current measured distance, among the stationary object distances stored in the storage unit 30. Therefore, even should the number of stationary objects within the detection area increase, the number of times that the current measured distance and the stationary object distance are compared can be reduced, compared with a configuration in which the current measured distance is compared with all stationary object distances for each angle number. As a result, the calculation load placed on the control unit 20 can be reduced. Consequently, a moving object can be extracted at a high speed, regardless of the number of stationary objects.

For each of the angle numbers 1 to 10, the current measured distance is compared with the stationary object distances stored in the storage unit 30 in order from the shortest stationary object distance. Therefore, in cases in which there is an increase in the number of stationary objects present in a row in a direction from the laser light irradiating unit 4a towards the irradiation direction, increase in the number of stationary object distances to be compared with the current measured distance can be suppressed. As a result, increase in the calculation load placed on the control unit 20 can be suppressed.

When determined that the distance determined to have remained unchanged for a prescribed period of time is longer than the shortest stationary object distance among the stationary object distances stored in the storage unit 30 in association with the angle number corresponding to the distance, the control unit 20 deletes, from the storage unit 30, the stationary object distance shorter than the distance determined to have remained unchanged for a prescribed period of time, among the stationary object distances stored in the storage unit 30. Therefore, when the number of stationary objects present in the detection area decreases, the number of stationary object distances to be compared with the current measured distance can be reduced. As a result, the storage capacity of the storage unit 30 can be conserved while reducing the calculation load placed on the control unit 20.

Instead of the configuration in which the stationary object distances are deleted from the storage unit 30, for example, a configuration in which the stationary object distance shorter than the distance determined to have remained unchanged for a prescribed period of time, among the stationary object distances stored in the storage unit 30, is eliminated from the comparison subjects in the comparison determination process without being deleted from the storage unit 30 can also be considered. However, in this case, the stationary object distances of stationary objects that are no longer present remain in the storage unit 30. Conservation of the storage capacity of the storage unit 30 cannot be achieved Other Embodiments The above-described embodiment may be modified in the following manner.

According to the above-described embodiment, the stationary object distances stored in the storage unit 30 are compared with the current measured distance in order from the shortest stationary object distance. However, the present disclosure is not limited thereto. For example, after the shortest stationary object distance among the stationary object distances stored in the storage unit 30 is determined not to match the current measured distance, the comparison subject to be compared with the current measured distance may be the third shortest stationary object distance among the stationary object distances stored in the storage unit 30.

The process at step S12 in FIG. 2 according to the above-described embodiment may be changed to a process in which a determination is made regarding whether or not a stationary object distance that is shorter than the distance determined to have remained unchanged for a prescribed period of time is present among the stationary object distances stored in the storage unit 30. In this case, the control unit 20 may proceed to step S15 when determined that a stationary object distance that is shorter than the distance determined to have remained unchanged is present at step S12.

The configuration is not limited to that in which the process at step S12 in FIG. 2 is performed at every processing cycle. For example, a configuration in which the process at step S12 is performed once every plurality of processing cycles is also possible.

The processes at steps S15 and S16 in FIG. 2 may be omitted. In this case, when determined NO at step S12, the control unit 20 may proceed to step S17.

The process at step S14 in FIG. 2 may be omitted.

According to the above-described embodiment, the deletion process at step S15 in FIG. 2 is that in which a stationary object distance that is shorter than the distance determined to have remained unchanged for a prescribed period of time at step S11, among the stationary object distances stored in the storage unit 30, is deleted from the storage unit 30 for each of the angle numbers. However, the present disclosure is not limited thereto. For example, the deletion process may be that in which a stationary object distance that is shorter than the current distance measured at step S10, among the stationary object distances stored in the storage unit 30, is deleted from the storage unit 30, for each of the angle numbers. In this case, for example, all stationary object distances shorter than the current measured distance among the stationary object distances stored in the storage unit 30 may be deleted. Alternatively, only the shortest stationary object distance among the stationary object distances stored in the storage unit 30 may be deleted.

Here, a specific example of the configuration in which only the shortest stationary object distance among the stationary object distances stored in the storage unit 30 is deleted will be described. For example, 5, 10, 15 are stored as the stationary object distances in the storage unit 30, for a certain angle number. In this case, when the current distance measured in the distance measurement process is 7, the stationary object distance 5 that is shorter than 7 is deleted from the storage unit 30. At this time, the current distance 7 is determined to a distance at which a moving object is present. Subsequently, when the current distance measured in the distance measurement process is 8, the comparison subject to be compared with the current measured distance is 10, which is the shortest stationary object distance stored in the storage unit 30. Then, as a result of the distance measured in the distance measurement process being determined to be 8 for a prescribed period of time, 8 is newly stored in the storage unit 30 as a stationary object distance.

According to the above-described embodiment, the laser light is irradiated at each of a plurality of irradiation angles, on a single horizontal plane (scanning plane) at a predetermined height position from the ground surface. However, the present disclosure is not limited thereto. For example, the laser light may be irradiated at each of a plurality of irradiation angles on a plurality of scanning places at predetermined height positions from the ground surface. In this case, in addition to the moving objects described according to the above-described embodiment, suspicious persons, animals, and the like hidden in the space between the underside of the vehicle and the ground surface can be detected as moving objects, depending on the settings of the scanning plane height.

Instead of the configuration according to the above-described embodiment, a configuration in which the stationary object distance that is shorter than the distance determined to have remained unchanged for a prescribed period of time, among the stationary object distances stored in the storage unit 30, is eliminated from the comparison subjects in the comparison determination process without being deleted from the storage unit 30 may be used.

According to the above-described embodiment, ten irradiation angles are used. However, the present disclosure is not limited thereto. A plurality of irradiation angles other than ten may be used.

The electromagnetic waves used for object detection is not limited to laser light. For example, radio waves such as millimeter waves may also be used.

What is claimed is:

1. An object detection apparatus that detects an object in a detection area based on reflected waves of irradiated electromagnetic waves, the object detection apparatus comprising:
  a memory; and
  a processor programmed to:
    measure a plurality of distances to a detected object at a corresponding one of a plurality of irradiation angles, based on the reflected waves of the electromagnetic waves irradiated at the corresponding one of the plurality of irradiation angles;

determine whether the plurality of measured distances remain unchanged for a prescribed period of time, for the corresponding one of the plurality of irradiation angles;

store, in the memory, the plurality of distances determined to have remained unchanged as a plurality of stationary object distances in association with the corresponding one of the plurality of irradiation angles;

compare a plurality of measured current distances and the plurality of stationary object distances stored in the memory for the corresponding one of the plurality of irradiation angles, initially comparing a shortest stationary object distance among the plurality of stationary object distances stored in the memory to the current distance, for the corresponding one of the plurality of irradiation angles;

determine whether at least one of the plurality of stationary object distances matching the current distance is present among the plurality of stationary object distances stored in the memory; and upon determining that at least one of the plurality of stationary object distances matching at least one of the plurality of current distances is present, stopping a comparison between the plurality of current distances and the plurality of stationary object distances that have not yet been compared with the plurality of current distances among the plurality of stationary object distances stored in the memory, wherein the object detection apparatus is provided at a fixed position.

2. The object detection apparatus according to claim 1, wherein the processor is programmed to:

delete, from the memory, at least one of the plurality of the stationary object distances that is shorter than the at least one of the plurality of distances determined to have remained unchanged, among the plurality of stationary object distances stored in the memory that are associated with the corresponding one of the plurality of irradiation angles.

3. The object detection apparatus according to claim 1, wherein the processor is programmed to:

delete, from the memory, at least one of the plurality of stationary object distances shorter than at least one of the plurality of the current distances, among the plurality of stationary object distances stored in the memory that are associated with the corresponding one of the plurality of irradiation angles.

4. The object detection apparatus according to claim 1, wherein the processor is programmed to:

identifying a moving object by determining that an object detected at the corresponding one of the plurality of irradiation angles does not have a matching one of the plurality of stationary object distances.

5. The object detection apparatus according to claim 1, wherein:

the electromagnetic waves are laser light.

6. The object detection apparatus according to claim 1, wherein the processor is programmed to:

compare the plurality of current distances to the plurality of stationary object distances stored in the memory in order from the shortest stationary object distance, for the corresponding one of the plurality of irradiation angles.

7. The object detection apparatus according to claim 6, wherein the processor is programmed to:

delete, from the memory, at least one of the plurality of stationary object distances that is shorter than at least one of the plurality of distances determined to have remained unchanged, among the plurality of stationary object distances stored in the memory that are associated with the corresponding one of the plurality of irradiation angles.

8. The object detection apparatus according to claim 6, wherein the processor is programmed to:

delete, from the memory, at least one of the plurality of stationary object distances shorter than at least one of the plurality of current distances, among the plurality of stationary object distances stored in the memory that are associated with the corresponding one of the plurality of irradiation angles.

9. An object detection apparatus that detects an object in a detection area based on reflected waves of irradiated electromagnetic waves, the object detection apparatus comprising:

a memory; and a processor programmed to:

measure a plurality of distances to a detected object at a corresponding one of a plurality of irradiation angles, based on the reflected waves of the electromagnetic waves irradiated at the corresponding one of the plurality of irradiation angles;

determine whether the plurality of measured distances remain unchanged for a prescribed period of time, for the corresponding one of the plurality of irradiation angles;

store, in the memory, the plurality of distances determined to have remained unchanged as a plurality of stationary object distances in association with the corresponding one of the plurality of irradiation angles;

compare a plurality of measured current distance and the plurality of stationary object distances stored in the memory for the corresponding one of the plurality of irradiation angles;

determine whether at least one of the plurality of stationary object distances matching at least one of the plurality of current distances is present among the plurality of stationary object distances stored in the memory; and delete, from the memory, at least one of the plurality of stationary object distances that is shorter than at least one of the plurality of distances determined to have remained unchanged, among the plurality of stationary object distances stored in the memory that are associated with the corresponding one of the plurality of irradiation angles, wherein the object detection apparatus is provided at a fixed position.

10. The object detection apparatus according to claim 9, wherein the processor is programmed to:

identifying a moving object by determining that an object detected at the corresponding one of the plurality of irradiation angles does not have a matching one of the plurality of stationary object distances.

11. The object detection apparatus according to claim 9, wherein:

the electromagnetic waves are laser light.

12. An object detection apparatus that detects an object in a detection area based on reflected waves of irradiated electromagnetic waves, the object detection apparatus comprising:

a memory; and a processor programmed to:
  measure a plurality of distances to a detected object at a corresponding one of a plurality of irradiation angles, based on the reflected waves of the electromagnetic waves irradiated at the corresponding one of the plurality of irradiation angles;
  determine whether the plurality of measured distances remain unchanged for a prescribed period of time, for the corresponding one of the plurality of irradiation angles;
  store, in the memory, the plurality of distances determined to have remained unchanged as a plurality of stationary object distances in association with the corresponding one of the plurality of irradiation angles;
  compare a plurality of current measured distances and the plurality of stationary object distances stored in the memory for the corresponding one of the plurality of irradiation angles;
  determine whether at least one of the plurality of stationary object distances matching the at least one of the plurality of current distances is present among the plurality of stationary object distances stored in the memory; and
  delete, from the memory, at least one of the plurality of stationary object distances that is shorter than at least one of the plurality of current measured distances, among the plurality of stationary object distances stored in the memory that are associated with the corresponding one of the plurality of irradiation angles,
wherein the object detection apparatus is provided at a fixed position.

13. The object detection apparatus according to claim 12, wherein the processor is programmed to:
  identifying a moving object by determining that an object detected at the corresponding one of the plurality of irradiation angles does not have a matching one of the plurality of stationary object distances.

14. The object detection apparatus according to claim 12, wherein:
  the electromagnetic waves are laser light.

15. A non-transitory computer-readable storage medium storing an object detection program for an object detection apparatus that detects an object in a detection area based on reflected waves of irradiated electromagnetic waves, the object detection program causing a computer to perform:
  a distance measuring process to measure a plurality of distances to a detected object at a corresponding one of a plurality of irradiation angles, based on the reflected waves of the irradiated electromagnetic waves at the corresponding one of the plurality of irradiation angles;
  a stationary-state determining process to determine whether the plurality of measured distances remain unchanged for a prescribed period of time, for the corresponding one of the plurality of irradiation angles;
  a storing process to store, in a memory provided in the computer, the plurality of distances determined to have remained unchanged by the stationary-state determining process as a plurality of stationary object distances in association with the corresponding one of the plurality of irradiation angles; and
  a comparison determining process to compare a plurality of measured current distances and the plurality of stationary object distances stored in the memory for the corresponding one of the plurality of irradiation angles, and to determine whether at least one of the plurality of stationary object distances matching the at least one of the plurality of current distances is present among the stationary object distances stored in the memory,
wherein the comparison determining process initially compares a shortest stationary object distance among the plurality of stationary object distances stored in the memory with the current distance, for the corresponding one of the plurality of irradiation angles, and upon determining that at least one of the plurality of stationary object distances matching at least one of the plurality of current distances is present, stops a comparison between the plurality of current distances and the plurality of stationary object distances that have not yet been compared with the plurality of current measured distances among the plurality of stationary object distances stored in the memory, and
the object detection apparatus is provided at a fixed position.

16. The non-transitory computer-readable storage medium storing the object detection program according to claim 15, wherein the object detection program causes the computer to further perform:
  a deleting process to delete, from the memory, at least one of the plurality of stationary object distances that is shorter than at least of the plurality of distances determined to have remained unchanged, among the plurality of stationary object distances stored in the memory that are associated with the corresponding one of the plurality of irradiation angles.

17. The non-transitory computer-readable storage medium storing the object detection program according to claim 15, wherein the object detection program causes the computer to further perform:
  a deleting process to delete, from the memory, at least one of the plurality of stationary object distances that is shorter than at least one of the plurality of measured current distances, among the plurality of stationary object distances stored in the memory that are associated with the corresponding one of the plurality of irradiation angles.

* * * * *